United States Patent
Bhoopalam et al.

(10) Patent No.: US 12,328,583 B2
(45) Date of Patent: Jun. 10, 2025

(54) METHOD AND SYSTEM FOR SECURELY HANDLING RE-CONNECTION OF CLIENT DEVICES TO A WIRELESS NETWORK

(71) Applicant: SAMSUNG ELECTRONICS CO., LTD., Suwon-si (KR)

(72) Inventors: Shashi Kumar Bhoopalam, Bellary (IN); Abdus Sarif Ahmed, Bengaluru (IN); Kumar Murugesan, Bangalore (IN); Varun Singh, Gorakhpur (IN); Kavin Kumar Thangadorai, Bangalore (IN); Radhika Mundra, Bangalore (IN); Dinakara Reddy Agraharam, Bangalore (IN); Yellappa Damam, Bengaluru (IN); Jitender Sajwan, Bengaluru (IN); Manbir Singh Soni, Bengaluru (IN); Srihari Sriram, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 290 days.

(21) Appl. No.: 18/065,586

(22) Filed: Dec. 13, 2022

(65) Prior Publication Data
US 2023/0114761 A1 Apr. 13, 2023

Related U.S. Application Data

(63) Continuation of application No. PCT/KR2022/011166, filed on Jul. 29, 2022.

(30) Foreign Application Priority Data

Jul. 29, 2021 (IN) .............................. 202141034251
Jul. 6, 2022 (IN) .............................. 2021 41034251

(51) Int. Cl.
*H04W 12/55* (2021.01)
*H04L 9/40* (2022.01)

(52) U.S. Cl.
CPC ......... *H04W 12/55* (2021.01); *H04L 63/1433* (2013.01)

(58) Field of Classification Search
CPC .................................................... H04W 12/55
See application file for complete search history.

(56) References Cited

U.S. PATENT DOCUMENTS 7,788,480 B2    8/2010    Winget et al.
8,290,163 B2    10/2012    Chang et al.
(Continued)

FOREIGN PATENT DOCUMENTS

CA    2983137 A1 * 4/2018 ......... H04L 63/0428
CN    107567072 A    1/2018
(Continued)

OTHER PUBLICATIONS

Extended European Search Report for EP 22849915.8 by European Patent Office dated Jun. 12, 2024.
(Continued)

*Primary Examiner* — Esther B. Henderson
(74) *Attorney, Agent, or Firm* — BROADVIEW IP LAW, PC

(57) ABSTRACT

The present disclosure is related to a method and system for securely handling re-connection by a wireless device. The method comprises establishing a connection with a plurality of client devices, wherein the wireless device establishes the connection with the plurality of client devices using a first security configuration and detecting whether a criterion is met to re-establish the connection with the plurality of client devices. The method also comprises dynamically generating a second security configuration to re-establish the connec-
(Continued)

tion with the plurality of client devices in response to detecting that the criterion is met. The method further comprises encrypting the second security configuration and sending the encrypted second security configuration to the plurality of client devices to re-establish the connection with the wireless device.

16 Claims, 11 Drawing Sheets

(56) References Cited

U.S. PATENT DOCUMENTS

| | | | |
|---|---|---|---|
| 8,631,471 B2 | 1/2014 | Siddhartha et al. | |
| 9,307,408 B2 | 4/2016 | Gupta et al. | |
| 10,091,242 B2 | 10/2018 | Britt et al. | |
| 2008/0159536 A1 | 7/2008 | Chang et al. | |
| 2008/0198823 A1 | 8/2008 | Shiu et al. | |
| 2015/0026317 A1 | 1/2015 | Ilsar et al. | |
| 2015/0071052 A1 | 3/2015 | Hershberg et al. | |
| 2019/0007420 A1 | 1/2019 | Eberlein et al. | |
| 2021/0251019 A1* | 8/2021 | Sayed | H04L 41/0806 |

FOREIGN PATENT DOCUMENTS

| | | |
|---|---|---|
| CN | 112584356 A | 3/2021 |
| CN | 108419237 B | 4/2021 |
| EP | 2979401 B1 | 2/2016 |
| EP | 3116187 A1 | 1/2017 |
| KR | 10-2016-0086140 A | 7/2016 |

OTHER PUBLICATIONS

International Search Report for PCT/KR2022/011166 by Korean Intellectual Property Office dated Nov. 4, 2022.

\* cited by examiner

METHOD AND SYSTEM FOR SECURELY HANDLING RE-CONNECTION OF CLIENT DEVICES TO A WIRELESS NETWORK

CROSS-REFERENCE TO RELATED APPLICATIONS

This application is a continuation application, claiming priority under § 365(c), of an International application No. PCT/KR2022/011166 filed on Jul. 29, 2022, which is based on and claims the benefit of an Indian Provisional Application No. 202141034251 filed on Jul. 29, 2021 and Indian Patent Application No. 202141034251 filed on Jul. 6, 2022 with the Indian Patent Office.

FIELD OF INVENTION

The present disclosure relates generally to a wireless network and, more specifically, to a method and system for securely handling re-connection of client devices to a wireless device in the wireless network.

BACKGROUND

With emergence of wireless telecommunications, home network in which multiple computing devices are communicatively linked together in a consumer's home are becoming increasingly ubiquitous. A home environment may include one or more computers, a wireless router, one or more Internet Of Things (IOT) devices, and one or more other devices capable of connecting to the home network.

With the usage of the home network, there is also an increasing need for the establishment of security to provide privacy and protect confidentiality of user data in the home network. In general, a user chooses to secure their home network by establishing network credentials for connecting to a wireless access point associated with the home network. Typically, each client device in the home network must be individually configured to connect to the wireless access point.

Many consumer wireless access points are preconfigured to implement various security protocols such as Wired Equivalent Privacy (WEP), Wi-Fi™ Protected Access (WPA), Wi-Fi™ Protected Access II (WPA2), or the like. These security protocols may enable a user of the home network to associate a password with a particular wireless access point identified via a service set identifier (SSID). Conventionally, to connect the client device to the wireless access point protected with one of the security protocols described above, the user may be required to select the SSID associated with the secure wireless access point from a list of broadcast SSIDs (or manually enter the SSID) and enter the password associated with the secure wireless access point. The client device then uses the SSID and password to establish a connection with the wireless access point. Client devices may also store the SSID and password to automatically reconnect to the secure wireless access point whenever the client device is within range of the wireless access point.

However, the user generally does not change their wireless access point configuration, which leaves them vulnerable to cyber-attacks. This also leads to compromise of wireless access point configuration, and unauthorized access to wireless access point once the credentials are comprised.

Moreover, currently the user has to configure all the client devices with AP's new configuration manually if the configuration is modified and there is no standard solution available for the client devices to re-connect back to the wireless access point automatically. Further, configuring each client device with a new credential is a tedious process considering the growing number of connected devices at the home network.

Thus, it is desired to address the above-mentioned disadvantages or other shortcomings or at least provide a useful alternative.

SUMMARY

The principal object of the embodiments herein is to provide a method implemented by a wireless device for securely handling re-connection of client devices associated with the wireless device in the wireless network. In the present disclosure, whenever there is a change in wireless device configuration, there is no need for the user to enter the changed configuration manually. Instead, the client devices automatically re-connects to the wireless device using the changed configuration. Thus, reducing a time required for re-connecting the client devices to the wireless device considerably compared to the conventional manual method of re-connecting to the wireless device.

Another object of the embodiment herein is to provide a method implemented by a client device for securely re-connecting with a wireless device.

Another object of the embodiment herein is to provide a wireless device that securely handles re-connection of client devices in a wireless network.

Another object of the embodiment herein is to provide a client device that securely re-connects with a wireless device upon disconnection of existing connection.

Accordingly, embodiments herein provide a method for securely handling re-connection by a wireless device. The method comprises establishing a connection with a plurality of client devices. The wireless device establishes the connection with the plurality of client devices using a first security configuration. The method further includes detecting whether criterion is met to re-establish the connection with the plurality of client devices. The method also includes dynamically generating a second security configuration to re-establish the connection with the plurality of client devices in response to detecting that the criterion is met. The method further includes encrypting the second security configuration and sending the encrypted second security configuration to the plurality of client devices to re-establish the connection with the wireless device.

In an embodiment, the method comprises receiving a request to re-establish the connection from the plurality of client devices using the second security configuration and reestablishing the connection with the plurality of client devices based on the second security configuration.

In an embodiment, the criterion comprises detecting an expiry of a time period associated with the wireless device to re-establish the connection with the plurality of client devices, detecting an expiry of a time period associated with the client device of the plurality of client devices to re-establish the connection with the wireless device, detecting a vulnerability in the wireless device, and detecting a vulnerability in the associated with the client device of the plurality of client devices.

In an embodiment, the first security configuration comprises at least one of a service set identifier (SSID) and password, wherein the second security configuration comprises at least one of a SSID and password different than the SSID and password of the first security configuration.

In an embodiment, the method comprises sending a Wi-Fi Re-board (WR) public key request message to the plurality of client devices upon the successful establishment of a connection between the plurality of client devices and the wireless device, wherein the public key request message includes information about crypto groups supported by the wireless device; receiving, by the wireless device, a WR public key response message from one or more client devices in response to the WR public key request, wherein the WR public key response message includes a CReconnectPKey (i.e., public key) associated with that particular client device, and a selected crypto group from the crypto groups; and storing, by the wireless device, a unique identifier associated with each of the one or more client devices along with the WR public key response message, in a re-board list.

In an embodiment, the method comprises detecting an attempt from the plurality of client devices to connect the wireless device using the first security configuration after the wireless device is configured with the second security configuration; verifying an identifier associated with each of the plurality of client devices against the stored unique identifier in the re-board list; and generating a unique AReconnectMKey for each client device stored in the re-board list upon successful verification, wherein the unique AReconnectMKey is generated using the CReconnectPKey and an AReconnectSKey, and wherein the AReconnectSKey is a private key associated with the wireless device.

In an embodiment, the method comprises sending a AReconnectPKey of the wireless device along with the encrypted second security configuration, wherein encrypting the second security configuration comprises encrypting the second security configuration using the generated unique AReconnectMKey.

Accordingly, embodiments herein provide a method for re-connecting a client device to a wireless device. The method comprises establishing a connection with the wireless device and detecting a change in configuration of the wireless device from a first security configuration to a second security configuration in response to disconnection of the established connection. The method also comprises receiving an encrypted second security configuration from the wireless device and decrypting the encrypted second security configuration. The method further comprises re-connecting to the wireless device using the decrypted second security configuration.

In an embodiment, the method comprises receiving the encrypted second security configuration along with the AReconnectPKey of the wireless device.

In an embodiment, decrypting the encrypted second security configuration comprises generating a unique CReconnectMKey using the AReconnectPKey and a CReconnectSKey, wherein the CReconnectSKey is a private key associated with the client device, and decrypting the encrypted second security configuration using the generated CReconnectMKey.

Accordingly, embodiments herein provide a wireless device for securely handling re-connection. The wireless device comprises a memory and a processor, coupled to the memory. The processor is configured to establish a connection with a plurality of client devices, wherein the wireless device establishes the connection with the plurality of client devices using a first security configuration. The processor is also configured to detect whether at least one criteria is met to re-establish the connection with the plurality of client devices and dynamically generate a second security configuration to reestablish the connection with the plurality of client devices in response to detecting that the at least one criteria is met. The processor is further configured to encrypt the second security configuration and send the encrypted second security configuration to the plurality of client devices to re-establish the connection with the wireless device.

In an embodiment, the processor is configured to receive a request to re-establish the connection from the plurality of client devices using the second security configuration and re-establish the connection with the plurality of client devices based on the second security configuration.

In an embodiment, to detect the at least one criteria, the processor is configured to detect an expiry of a time period associated with the wireless device to reestablish the connection with the plurality of client devices, detect an expiry of a time period associated with at least one client device of the plurality of client devices to reestablish the connection with the wireless device, detect a vulnerability in the wireless device, and detect a vulnerability in the associated with at least one client device of the plurality of client devices.

In an embodiment, the processor is configured to send a WR public key request message to the plurality of client devices upon the successful establishment of connection between a plurality of client devices and the wireless device, wherein the public key request message includes information about crypto groups supported by the wireless device. The processor is also configured to receive a WR public key response message from one or more client devices in response to the WR public key request, wherein the WR public key response message includes a CReconnectPKey associated with that particular client device, and a selected crypto group from the crypto groups; and store a unique identifier associated with each of the one or more client devices along with the WR public key response message, in a re-board list.

In an embodiment, the processor is configured to detect an attempt from the plurality of client devices to connect the wireless device using the first security configuration after the wireless device is configured with the second security configuration and verify an identifier associated with each of the plurality of client devices against the stored unique identifier in the re-board list. The processor is also configured to generate a unique AReconnectMKey for each client device stored in the re-board list upon successful verification, wherein the unique AReconnectMKey is generated using the CReconnectPKey and a AReconnectSKey, and wherein the AReconnectSKey is a private key associated with the wireless device.

Accordingly, embodiments herein provide a client device for securely reconnects with a wireless device. The client device comprises a memory and a processor, coupled to the memory. The processor is configured to establish a connection with the wireless device and detect a change in configuration of the wireless device from a first security configuration to a second security configuration in response to disconnection of the established connection. The processor is configured to receive an encrypted second security configuration from the wireless device, decrypt the encrypted second security configuration, and re-connect to the wireless device using the decrypted second security configuration.

In an embodiment, the processor is configured to receive the encrypted second security configuration along with an AReconnectPKey of the wireless device.

In an embodiment, wherein to decrypt the encrypted second security configuration, the processor is configured to generate a unique CReconnectMKey using the AReconnectPKey and a CReconnectSKey, wherein the CReconnectSKey is a private key associated with the client device and decrypt the encrypted second security configuration using the generated CReconnectMKey.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

BRIEF DESCRIPTION OF FIGURES

This method and associated wireless device& client device are illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
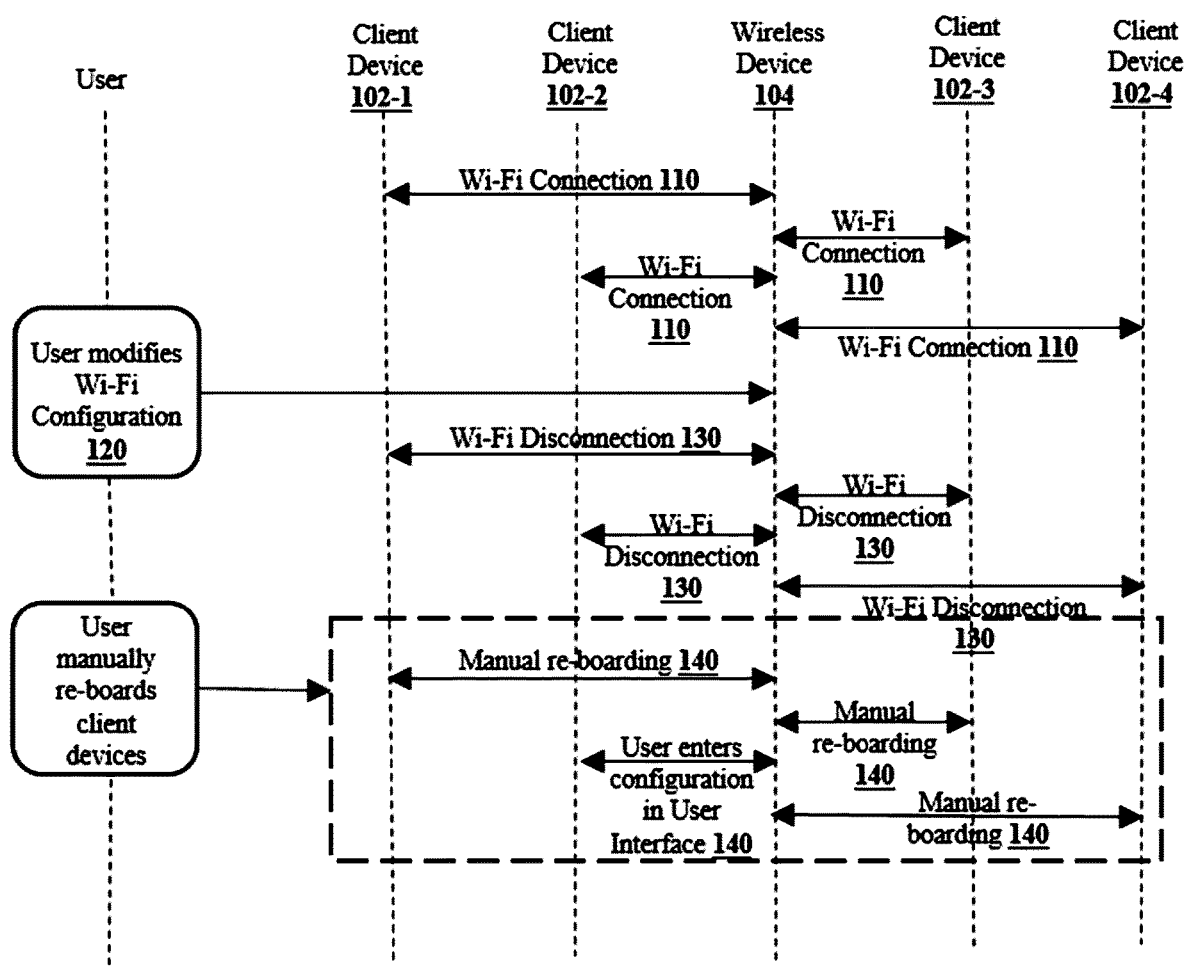
FIG. 1 illustrates a scenario of sequence flow of a conventional method for connecting client devices to a wireless device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein. A phrase "at least one of" preceding as a series of items, with terms "and" or "or" to separate any of the items, allows a meaning that includes at least one of any one of the items, and/or at least one of any combination of the items, and/or at least one of each of the items. For example, each of the phrases "at least one of A, B, C and C" or "at least one of A, B, or C" refers to only A, only B, or only C; any combination of A, B, C; and/or at least one of each of A, B, and C As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hard-wired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

The terms "client device" and "client" mean the same and are used interchangeably throughout this document. The terms "wireless device", "access point", and "AP" mean the same and are used interchangeably throughout this document.

Accordingly, embodiments herein provide a method for securely handling re-connection by a wireless device. The method comprises establishing a connection with a plurality of client devices. The wireless device establishes the connection with the plurality of client devices using a first security configuration. The method further includes detecting whether criterion is met to re-establish the connection with the plurality of client devices. The method also includes dynamically generating a second security configuration to reestablish the connection with the plurality of client devices in response to detecting that the criterion is met. The method further includes encrypting the second security configuration and sending the encrypted second security configuration to the plurality of client devices to reestablish the connection with the wireless device.

In the conventional methods and systems, when the configuration of the wireless device (i.e., SSID, password, or security type) is modified, the user has to connect all the clients with wireless device's new configuration manually. However, connecting each client with a new credential is a tedious process considering the growing number of connected devices at home.

Unlike to the conventional methods and systems, in the present disclosure when the configuration of the wireless device is changed, automatically the client devices re-connect with the wireless device using the modified configuration without having any user intervention. In the present disclosure, information about the modified configuration is encrypted and the encrypted modified configuration is shared with all client devices or only with the trusted client devices, which can decrypt the encrypted modified configuration. Using the decrypted modified configuration, the client devices automatically re-connect with the wireless device without any user intervention.

Referring now to the drawings, and more particularly to FIGS. 1 through 11, where similar reference characters denote corresponding features consistently throughout the figures, there are shown preferred embodiments.

FIG. 1 illustrates a scenario of sequence flow of conventional methods. As depicted in FIG. 1, the user initially onboarded the client device 102-1 (as an example Doorbell), client device 102-2 (as an example Mobile Phone), client device 102-3 (as an example Smart speaker), and client device 102-4 (as an example Wi-Fi bulb), to the wireless device or Access Point (AP) 104. In order to onboard the client devices 102 to the AP 104, the user enters the Wi-Fi AP configuration using either Mobile GUI or ad-hoc network to establish Wi-Fi connection 110.

The client devices 102, such as smartphones, laptops, tablets, etc., get the Wi-Fi credentials by scanning Quick Response (QR) codes or through Graphical User Interface (GUI). Some IoT client devices follow classical onboarding processes like connecting over the ad-hoc network.

In the ad-hoc network, the client devices 102 create an ad-hoc distributed network. Then the user connects the rich UI client devices 102 like a smartphone to the ad-hoc network and provides the new Wi-Fi AP configuration. Now, the client devices 102 disconnects from the ad-hoc network, connect to the Wi-Fi AP using that configuration and access the Internet.

When the user modifies the Wi-Fi AP configuration (SSID or password) 120, all the client devices 102 connected to the AP 104 will be disconnected 130. Then, the client devices 102 cannot connect back to the AP 104 with older configurations. Further, the user manually needs to re-board 140 each client device 102 back to the AP 104 by applying the new Wi-Fi AP configuration. The Mobile Phone 102-2 is re-boarded by entering the modified Wi-Fi AP configuration in the user interface (UI). However, the client devices 102 such as doorbells, Wi-Fi bulbs, and Smart speakers are re-boarded using the ad-hoc network technique, as explained previously.

Thus, whenever there is a change in the Wi-Fi AP configuration, it takes considerable user effort and time to reconnect all the client devices back to the AP 104. It becomes even more tedious and time-consuming for the users to reconnect the IoT devices. This is because these devices do not have UI to enter the new Wi-Fi configuration. It becomes a serious concern when the Wi-Fi network contains many such IoT devices.

Figure 2:
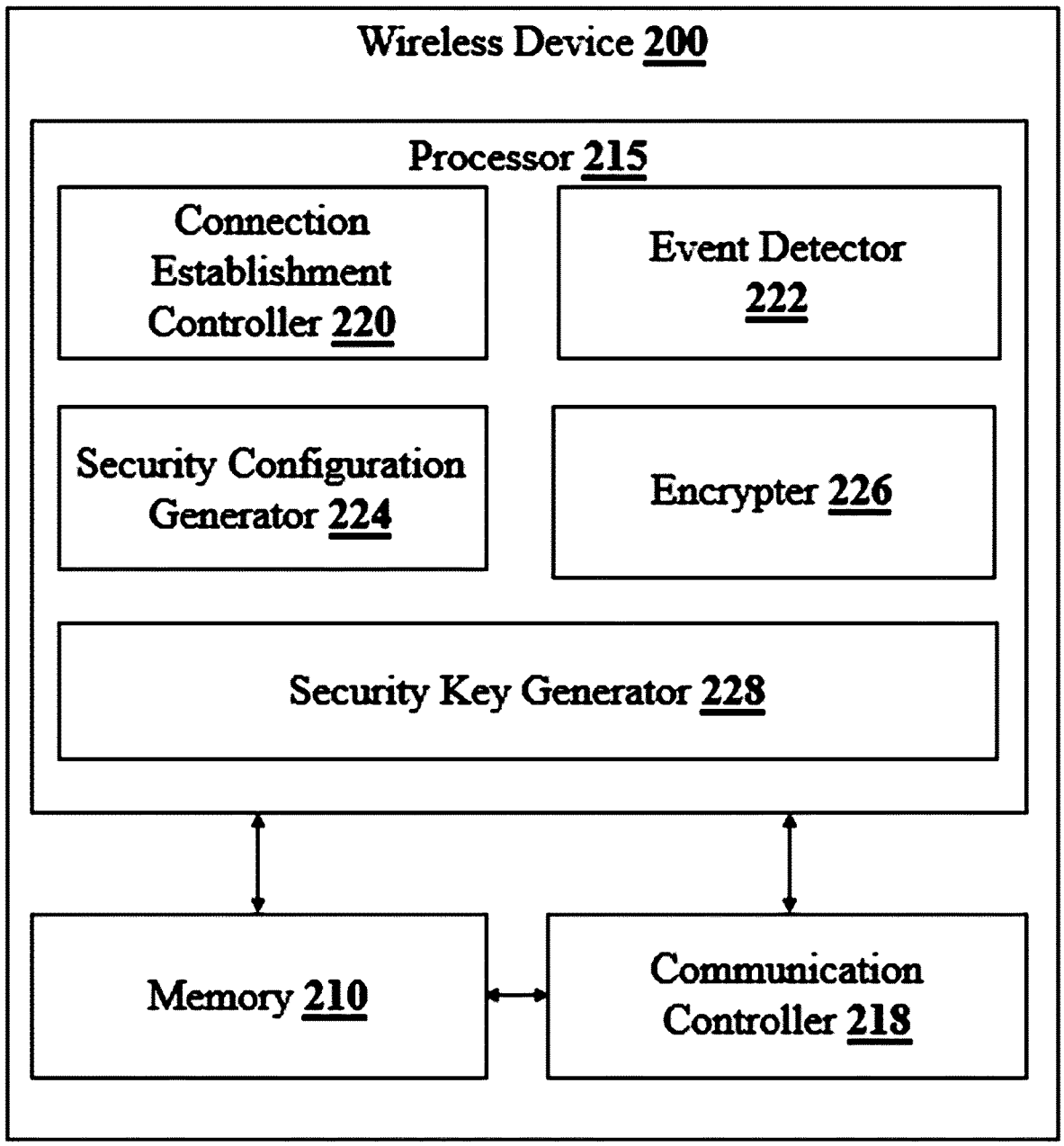
FIG. 2 illustrates a block diagram of a wireless device that securely handles re-connection of client devices in a wireless network, according to the embodiments as disclosed herein.

FIG. 2 illustrates a block diagram of a wireless device that securely handles re-connection of client devices in a wireless network, according to the embodiments as disclosed herein. In an embodiment, the wireless device 200 includes a memory 210, processor 215, and a communication controller 218. The processor 215 comprises a connection establishment controller 220, an event detector 222, a security configuration generator (224), an encrypter 226, and a security key generator 228.

The memory 210 stores one or more data related to client devices 102 and the wireless device 200, and also instructions to be executed by the processor 215. The memory 210 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 210 may, in some examples, be considered a non-transitory storage medium. The term "non-transitory" may indicate that the storage medium is not embodied in a carrier wave or a propagated signal. However, the term "non-transitory" should not be interpreted that the memory 210 is non-movable. In some examples, the memory 210 can be configured to store larger amounts of information than the memory. In certain examples, a non-transitory storage medium may store data that can, over time, change (e.g., in Random Access Memory (RAM) or cache). In an embodiment, the memory 210 can be an internal storage unit or it can be an external storage unit of the wireless device 200, a cloud storage, or any other type of external storage.

The processor 215 communicates with the memory 210 and the communicator controller 218. The processor 215 is configured to execute instructions stored in the memory 210 and to perform various processes.

The communication controller 218 is configured for communicating internally between internal hardware components and with external devices via one or more networks. The communication controller 218 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the connection establishment controller 220 establishes a connection with a plurality of client devices 102. The connection establishment controller 220 of the wireless device 200 is configured to establish the connection with the plurality of client devices 102 when each of the client devices 102 inputs a first security configuration of the wireless device 200. In one embodiment, the first security configuration comprises a service set identifier (SSID), password, and security type of the wireless device 200. After the connection is established successfully, the connection establishment controller 220 is configured to send a Wi-Fi Re-board (WR) public key request message to each of the plurality of client devices 102. The WR public key request message includes information about crypto groups supported by the wireless device 200. The connection establishment controller 220 is also configured to receive a WR public key response message from one or more client devices 102 in response to the WR public key request, wherein the WR public key response message includes a CReconnectPKey (i.e., public key) associated with that particular client device and a selected crypto group from the crypto groups. Upon receiving the WR public key response message, the connection establishment controller 220 enables the wireless device 200 to store a unique identifier (for example MAC identifier) associated with each of the one or more client devices 102 along with the WR public key response message, in a re-board list of the memory 230.

In one embodiment, the event detector 222 is configured to detect whether criterion is met to re-establish the connection with the plurality of client devices 102. In one embodiment, the criterion comprises detecting an expiry of a time period associated with the wireless device 200 to re-establish the connection with the plurality of client devices 102. In another embodiment, the criterion comprises detecting a vulnerability in the wireless device 104. In yet another embodiment, the criterion comprises detecting an expiry of a time period associated with at least one client device of the plurality of client devices 102 to re-establish the connection with the wireless device 104. In yet another embodiment, the criterion comprises detecting a vulnerability associated with at least one client device of the plurality of client devices 102.

In one embodiment, the security configuration generator 224 is configured to dynamically generate a second security configuration to reestablish the connection with the plurality of client devices 102 in response detecting that the criterion is met. The second security configuration can include modification to SSID, password, or security type, or combinations thereof, compared to the first security configuration. In another embodiment, the security configuration generator 224 is configured to dynamically generate the second security configuration to reestablish the connection with the plurality of client devices 102 based on user input to modify the configuration.

Further, the connection establishment controller 220 is configured to detect an attempt from the plurality of client device 102 to connect the wireless device 200 using the first security configuration after the wireless device 200 is changed configuration from the first security configuration to the second security configuration. The connection establishment controller 220 is configured to verify an identifier associated with each of the plurality of client device 102 against the stored unique identifier in the re-board list upon detecting the attempt.

In one embodiment, the security key generator 228 is configured to generate a unique AReconnectMKey (i.e., shared key) for each of client devices 102 stored in the re-board list upon successful verification. The unique AReconnectMKey is generated using the CReconnectPKey (i.e., public key of client device) and a AReconnectSKey (i.e., private key of the wireless device).

In one embodiment, the encrypter 226 is configured to encrypt the second security configuration using each of the unique AReconnectMKey for each client device included in the re-board list of the memory 210.

In one embodiment, the processor 215 enables the wireless device 200 to send the encrypted second security configuration to the plurality of client devices 102 to reestablish the connection with the wireless device 200. In one embodiment, the wireless device 200 is configured to send a public key of the wireless device 200 along with the encrypted second security configuration.

Figure 3:
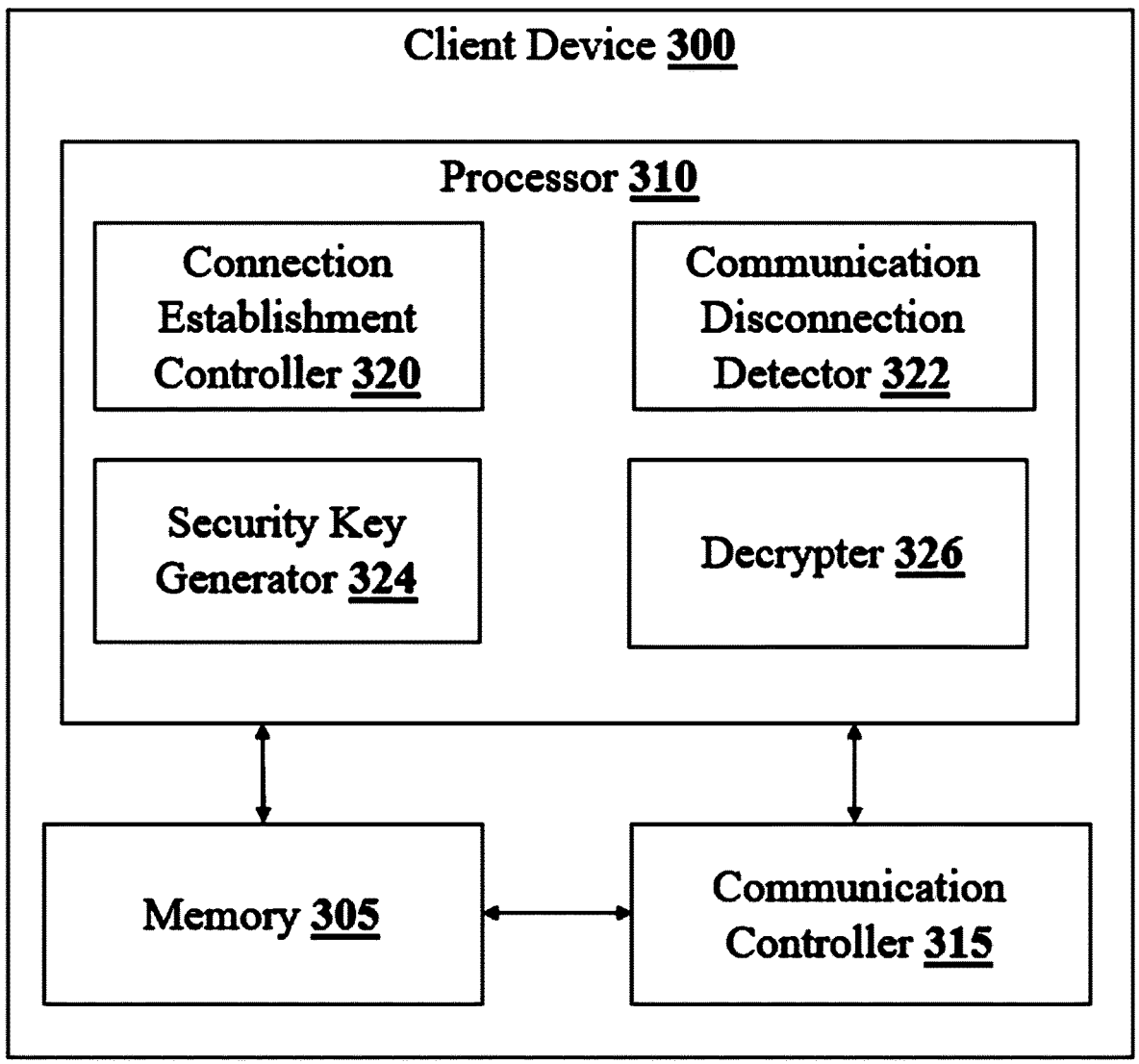
FIG. 3 illustrates a block diagram of a client device that securely re-connects with a wireless device, according to the embodiments as disclosed herein.

FIG. 3 illustrates a block diagram of a client device that securely re-connects with the wireless device, according to the embodiments as disclosed herein. In an embodiment, the client device 300 includes a memory 305, processor 310, and a communication controller 315. The processor 310 comprises a connection establishment controller 320, a communication disconnection detector 322, a security key generator 324, and a decrypter 326.

The memory 310 stores one or more data related to client device 300 and the wireless device 200, and also instructions to be executed by the processor 310. The memory 305 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 305 may, in some examples, be considered a non-transitory storage medium. The term "non-transitory" may indicate that the storage medium is not embodied in a carrier wave or a propagated signal. However, the term "non-transitory" should not be interpreted that the memory 305 is non-movable. In some examples, the memory 305 can be configured to store larger amounts of information than the memory 305. In certain examples, a non-transitory storage medium may store data that can, over time, change (e.g., in Random Access Memory (RAM) or cache). In an embodiment, the memory 305 can be an internal storage unit or it can be an external storage unit of the client device 300, a cloud storage, or any other type of external storage.

The processor 310 communicates with the memory 305 and the communicator controller 315. The processor 310 is configured to execute instructions stored in the memory 305 and to perform various processes.

The communication controller 315 is configured for communicating internally between internal hardware components and with external devices via one or more networks. The communication controller 315 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the connection establishment controller 320 is configured to establish the connection with the wireless device 200 when a user associated with the client device 300 inputs a first security configuration of the wireless device 200. In one embodiment, the first security configuration comprises a service set identifier (SSID), password, and security type of the wireless device 200. After the connection is established successfully, the connection establishment controller 320 is configured to receive a Wi-Fi Re-board (WR) public key request message from the wireless device 200. The WR public key request message includes information about crypto groups supported by the wireless device 200. The connection establishment controller 320 is then configured to send a WR public key response message in response to the WR public key request, wherein the WR public key response message includes a CReconnectPKey (i.e., public key) associated with the client device 300, and a selected crypto group from the crypto groups.

In one embodiment, the communication disconnection detector 322 is configured to detect disconnection of an existing connection with the wireless device 300 and also detect the change in configuration of the wireless device 300 from a first security configuration to a second security configuration in response to the detected disconnection.

In one embodiment, the security key generator 324 is configured to generate the CReconnectPKey (i.e., public key of client device 300) and CReconnectSKey (i.e., private key of client device 300).

In one embodiment, the decrypter 326 is configured to decrypt an encrypted second security configuration received from the wireless device 200. The decrypter 326 is configured to decrypt the encrypted second security configuration using a common shared key that is generated using the CReconnectSKey (i.e., private key) of the client device 300 and the AReconnectPKey (i.e., public key) of the wireless device 200. Upon decrypting the encrypted second security configuration, the client device 300 automatically re-connects to the wireless device 200 using one of the standard techniques.

Figure 4:
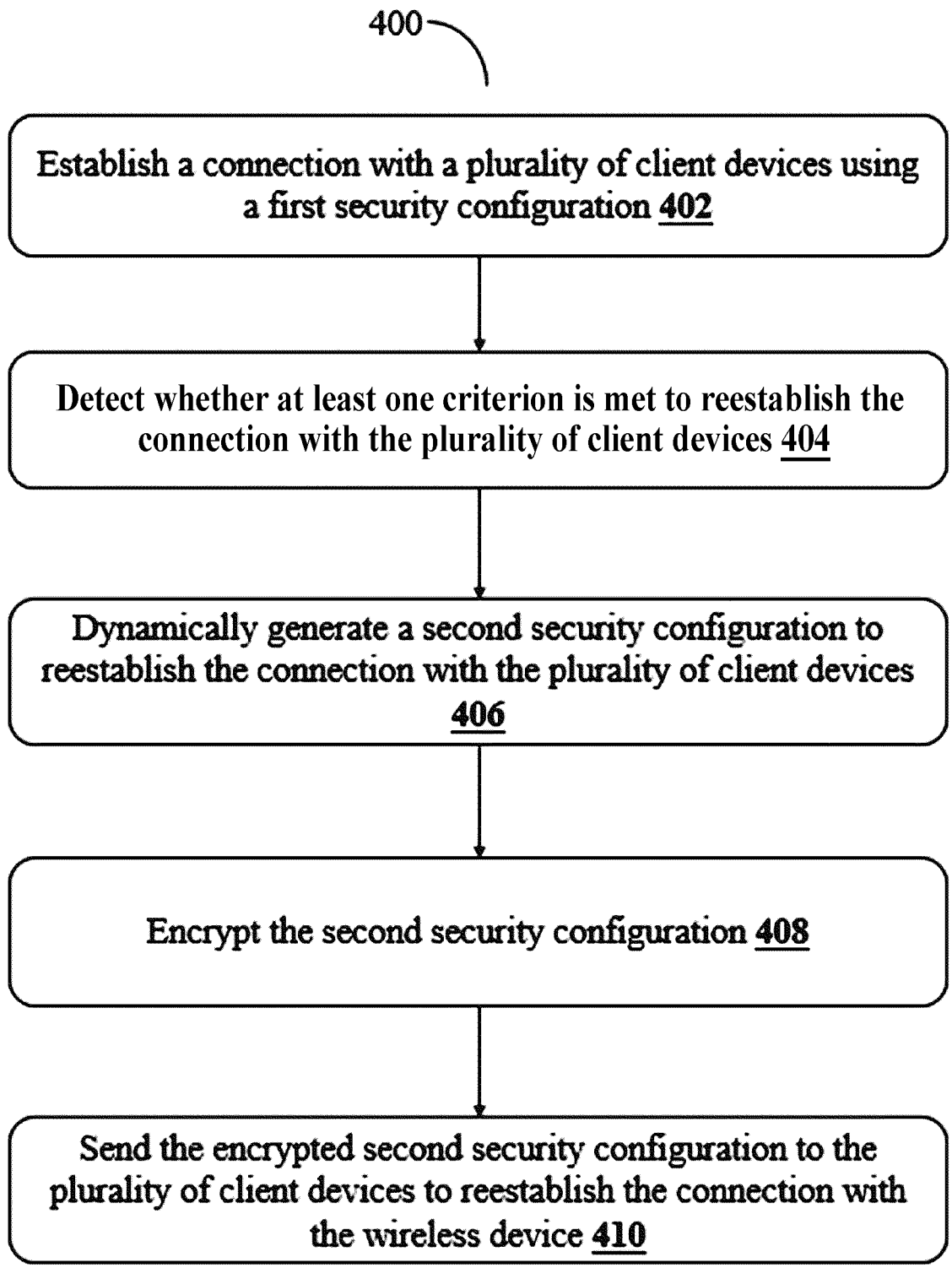
FIG. 4 is a flow diagram illustrating various operations implemented by a wireless device for securely handling re-connections of client devices, according to the embodiments as disclosed herein.

FIG. 4 is a flow diagram 400 illustrating various operations implemented by a wireless device for securely handling re-connections of client devices, according to the embodiments as disclosed herein.

As illustrated in FIG. 4, the method 400 comprises one or more blocks implemented by the wireless device 200. The order in which the method 400 is described is not intended to be construed as a limitation, and any number of the described method blocks can be combined in any order to implement the method 400. Additionally, individual blocks may be deleted from the method 400 without departing from the scope of the subject matter described herein.

At block 402, a connection with a plurality of client devices 300 is established. In an embodiment, the connection establishment controller 220 is configured to establish a connection with a plurality of client devices 300. The connection establishment controller 220 of the wireless device 200 is configured to establish the connection with the plurality of client devices 300 when each of the client devices 300 inputs a first security configuration of the wireless device 200. In one embodiment, the first security configuration comprises a service set identifier (SSID), password, security type of the wireless device 200, and combinations thereof. After the connection is established successfully, the connection establishment controller 220 is configured to send a Wi-Fi Re-board (WR) public key request message to each of the plurality of client devices 300. The WR public key request message includes information about crypto groups supported by the wireless device 200. The connection establishment controller 220 is also configured to receive a WR public key response message from one or more client devices 300 in response to the WR public key request, wherein the WR public key response message includes a CReconnectPKey (i.e., public key) associated with that particular client device, and a selected crypto group from the crypto groups. Upon receiving the WR public key response message, the connection establishment controller 220 enables the wireless device 200 to store a unique identifier (for example MAC identifier) associated with each of the one or more client devices 300 along with the WR public key response message, in a re-board list of the memory 230.

At block 404, whether at least one criterion is met to reestablish the connection with the plurality of client devices 300 is detected. In one embodiment, the event detector 222 is configured to detect whether at least one criterion is met to reestablish the connection with the plurality of client devices 300. In one embodiment, the at least one criterion comprises detecting an expiry of a time period associated with the wireless device 200 to reestablish the connection with the plurality of client devices 300. In another embodiment, the at least one criterion comprises detecting a vulnerability in the wireless device 200. In yet another embodiment, the at least one criterion comprises detecting an expiry of a time period associated with at least one client device 300 of the plurality of client devices 300 to reestablish the connection with the wireless device 200. In yet another embodiment, the at least one criterion comprises detecting a vulnerability in the associated with at least one client device of the plurality of client devices 300.

At block 406, a second security configuration to reestablish the connection with the plurality of client devices 300 is generated. In one embodiment, the security configuration generator 224 is configured to dynamically generate a second security configuration to reestablish the connection with the plurality of client devices 300 in response detecting that the at least one criterion is met. The second security configuration can includes modification to SSID, password, security type, or combinations thereof, compared to the first security configuration. Further, the connection establishment controller 220 is configured to detect an attempt from the plurality of client devices 300 to connect the wireless device 200 using the first security configuration after a change in configuration from the first security configuration to the second security configuration takes place in the wireless device 200. The connection establishment controller 220 is configured to verify an identifier associated with each of the plurality of client device 300 against the stored unique identifier in the re-board list upon detecting the attempt. In one embodiment, the security key generator 228 is configured to generate a unique AReconnectMKey (i.e., shared key) for each of client devices 300 stored in the re-board list upon successful verification. The unique AReconnectMKey is generated using the CReconnectPKey (i.e., public key of client device) and a AReconnectSKey (i.e., private key of the wireless device).

At block 408, the second security configuration is encrypted. In one embodiment, the encrypter 226 is configured to encrypt the second security configuration using each of the unique AReconnectMKey for each of client devices included in the re-board list of the memory 210.

At block 410, the encrypted second security configuration to the plurality of client devices 300 is sent to reestablish the connection with the wireless device 200. In one embodiment, the processor 215 enables the wireless device 200 to send the encrypted second security configuration to the plurality of client devices 300 to reestablish the connection with the wireless device 200. In one embodiment, the wireless device 200 is configured to send a public key of the wireless device 200 along with the encrypted second security configuration.

Figure 5:
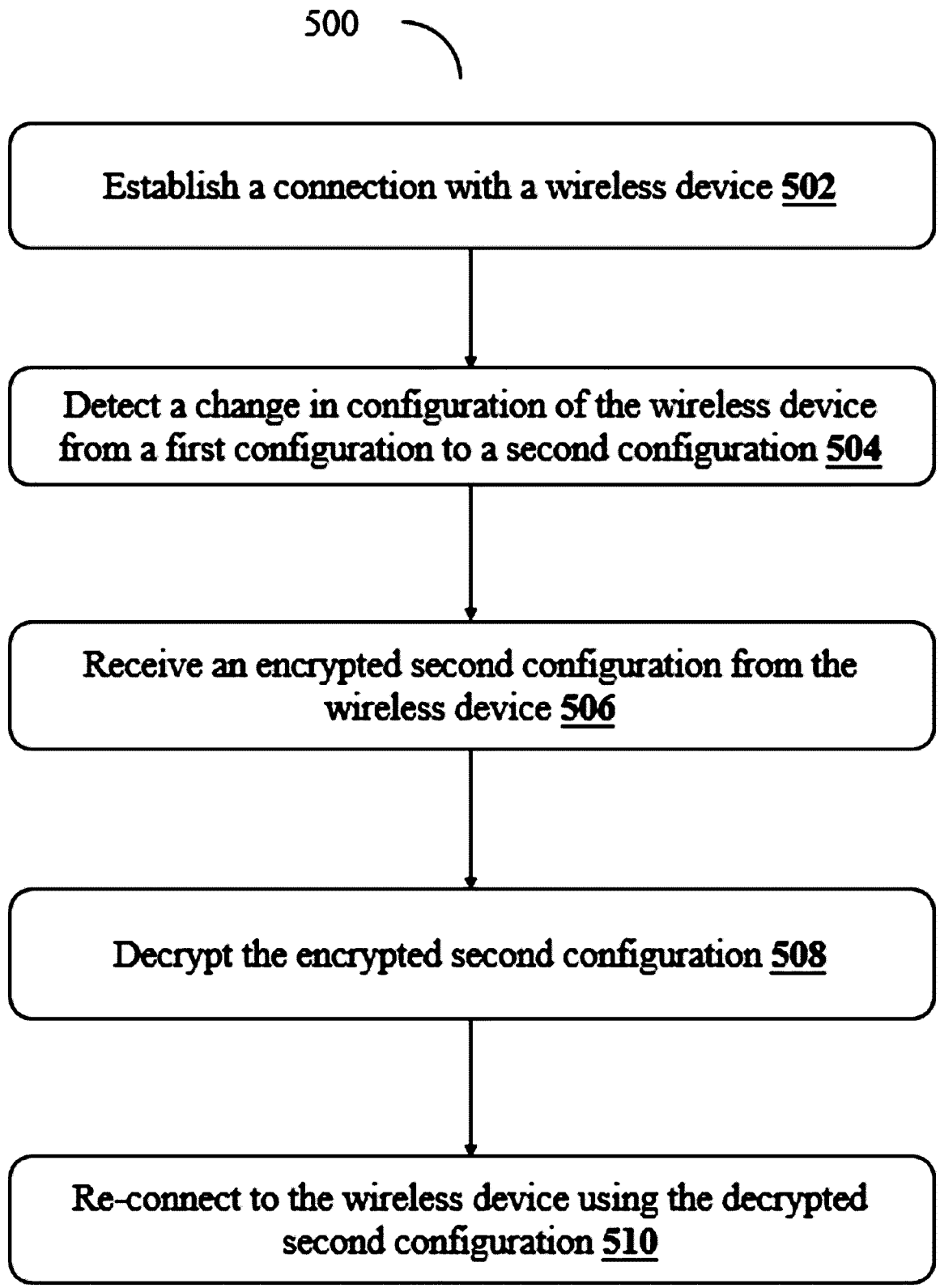
FIG. 5 is a flow diagram illustrating various operations implemented by a client device for securely re-connecting with a wireless device, according to the embodiments as disclosed herein.

FIG. 5 is a flow diagram illustrating various operations implemented by a client device for securely re-connecting to wireless device, according to the embodiments as disclosed herein.

As illustrated in FIG. 5, the method 500 comprises one or more blocks implemented by the client device 300. The order in which the method 500 is described is not intended to be construed as a limitation, and any number of the described method blocks can be combined in any order to implement the method 500. Additionally, individual blocks may be deleted from the method 500 without departing from the scope of the subject matter described herein.

At block 502, a connection with the wireless device 200 is established. In one embodiment, the connection establishment controller 320 is configured to establish the connection with the wireless device 200 when a user associated with the client device 300 inputs a first security configuration of the wireless device 200. In one embodiment, the first security configuration comprises a service set identifier (SSID), password, security type, and any combination thereof, of the wireless device 200. After the connection is established successfully, the connection establishment controller 320 is configured to receive a Wi-Fi Re-board (WR) public key request message from the wireless device 200. The WR public key request message includes information about crypto groups supported by the wireless device 200. The connection establishment controller 320 is then configured to send a WR public key response message in response to the WR public key request, wherein the WR public key response message includes a CReconnectPKey (i.e., public key) associated with the client device 300, and a selected crypto group from the crypto groups.

At block 504, a change in configuration of the wireless device 200 is detected from a first security configuration to a second security configuration. In one embodiment, the communication disconnection detector 322 is configured to detect disconnection of an existing connection with the wireless device 300 and also detect the change in configuration of the wireless device 300 from a first security configuration to a second security configuration in response to the detected disconnection.

At block 506, an encrypted second security configuration is received from the wireless device 200. In one embodiment, the processor 310 enables the client device 300 to receive the encrypted second security configuration from the wireless device 200. In one embodiment, client device 300 receives the AReconnectPKey (i.e., public key) of the wireless device 200 along with the encrypted second security configuration from the wireless device 200.

At block 508, the encrypted second security configuration is decrypted. In one embodiment, the decrypter 326 is configured to decrypt an encrypted second security configuration received from the wireless device 200. The decrypter 326 is configured to decrypt the encrypted second security configuration using a common shared key that is generated using the CReconnectSKey (i.e., private key) of the client device 300 and the AReconnectPKey (i.e., public key) of the wireless device 200.

At block 510, the client device 300 re-connects to the wireless device 200 using the decrypted second security configuration. In one embodiment, the client device 300 automatically re-connects to the wireless device 200 using one of the standard techniques upon decrypting the encrypted second security configuration.

Figure 6:
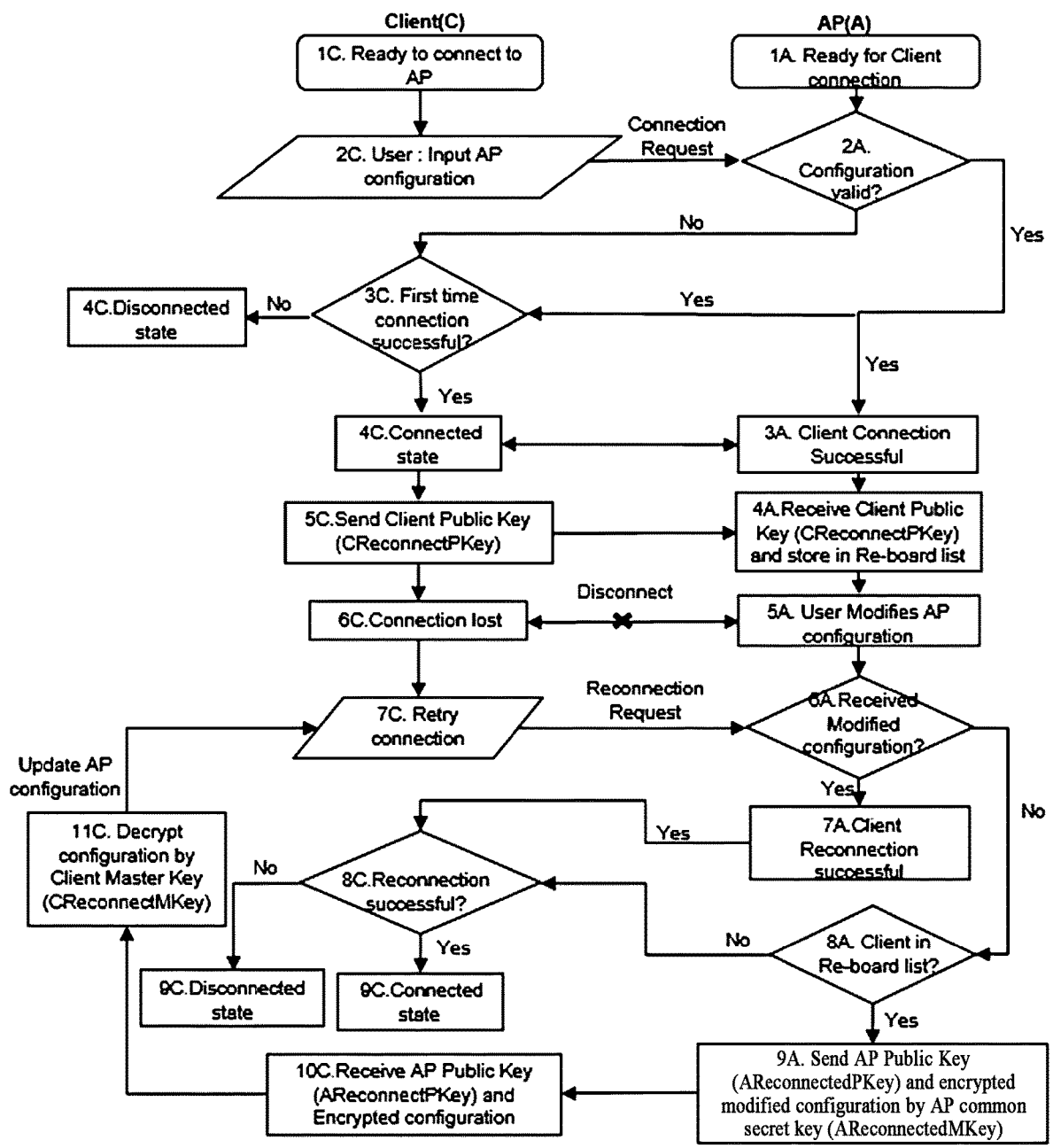
FIG. 6 is an example illustrating the step-by-step procedure between the client device and access point for establishing re-connection, according to the embodiments as disclosed herein.

FIG. 6 is an example illustrating the step-by-step procedure between client device and access point for establishing re-connection, according to the embodiments as disclosed herein. As shown in FIG. 6, user on-boards the client device 300 to the Wi-Fi AP 200 using the existing on-boarding technique (as shown in steps 1A to 4C). After a successful connection to the AP 200, the client 300 sends its public key (called CReconnectPKey) to the AP 200 (as shown in step 5C). Now, the client's public key and its Medium Access Control (MAC) address are stored in the AP 200 (in Re-board list) (at step 4A). The client devices 300 will be disconnected when the user modifies the Wi-Fi AP configuration (SSID or password or security type) (at step 5A and 6C). Now, the client 300 attempts to reconnect to the AP 200 using the previous AP's configuration (at step 7C). At this instant, the client validation at the AP 200 fails due to the configuration mismatch. Then, the AP 200 checks whether the client presents in the Re-board list (at step 8A) and its public key (CReconnectPKey) is stored or not. Once AP 200 finds the client's CReconnectPKey in the Re-board list, it derives a common secret key (called AReconnectMKey) using its private key along with. Then, AP 200 sends its public key (called AReconnectPKey) and the modified configuration (encrypted using common secret; AReconnectMKey) (at step 9A). Now the client 300, upon receiving AReconnectPKey, derives a common secret key (called CReconnectMKey) and decrypts the modified configuration (at step 11C). After this, the client 300 attempts reconnection to the AP 200 using those modified configurations, and it will succeed.

Figure 7:
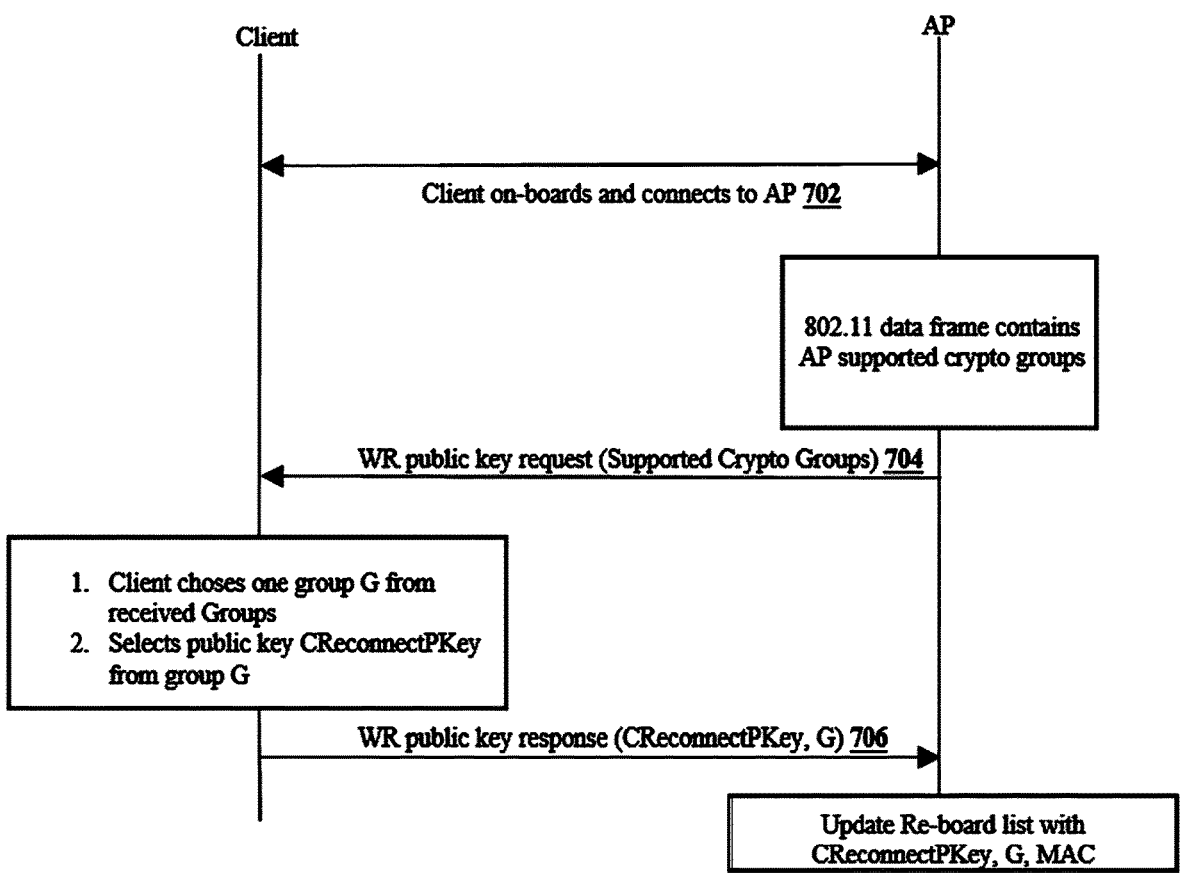
FIG. 7 illustrates a sequential flow diagram for public key exchange between the client device and access point, according to the embodiments as disclosed herein.
Figure 9A:
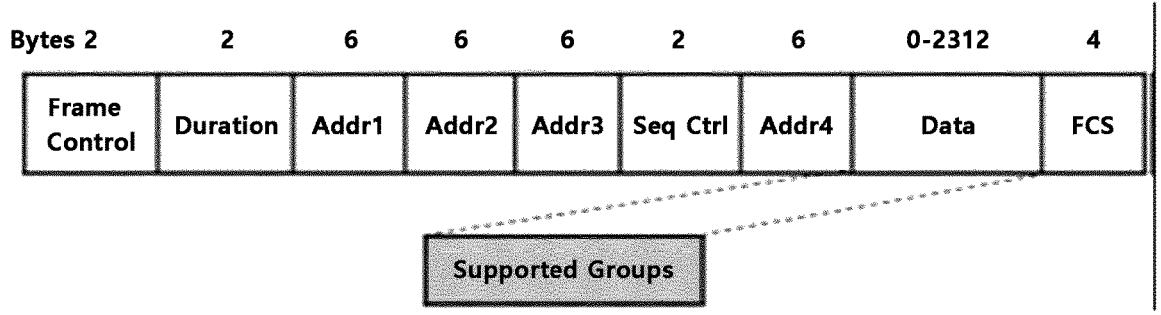
FIG. 9A illustrates a scenario of WR public key request data frame format, according to the embodiments as disclosed herein.

FIG. 7 illustrates a sequential flow diagram for public key exchange between client device and wireless device, according to the embodiments as disclosed herein. As shown in FIG. 7, at first, the client 300 gets on-boarded 702 to the AP 200. Then, the AP 200 sends the WR Public Key Request frame 704 (as shown in FIG. 9A) with its supported crypto groups to the client 300. On receiving the WR Public Key Request frame, the client 300 chooses one group (G) from the received crypto groups and derives a public key (CReconnectPKey) using the chosen crypto group (G).

Figure 9B:
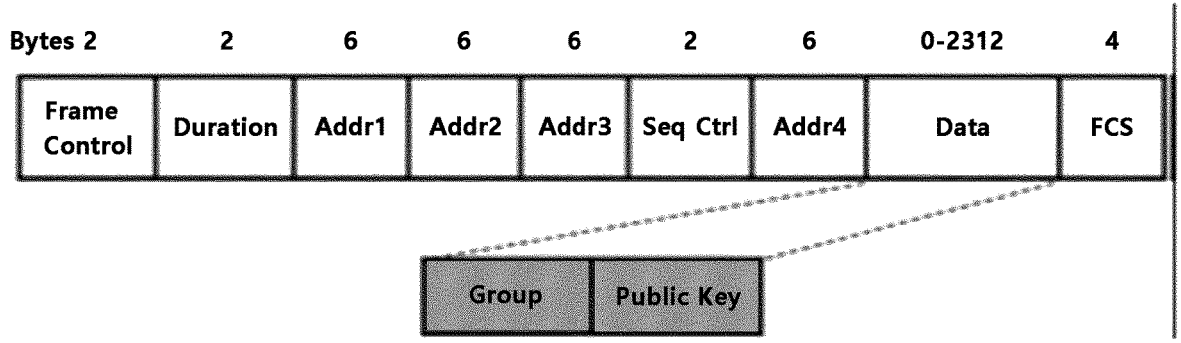
FIG. 9B illustrates a scenario of WR public key response data frame format, according to the embodiments as disclosed herein.

The client 300 then responds with a WR Public Key Response frame (as shown in FIG. 9B) with the chosen crypto group (G) and CReconnectPKey 706 to the AP 200. Upon receiving this, the AP 200 stores the CReconnectPKey, the chosen crypto group, and the client's MAC address in the Re-Board list of the memory 210.

Figure 8:
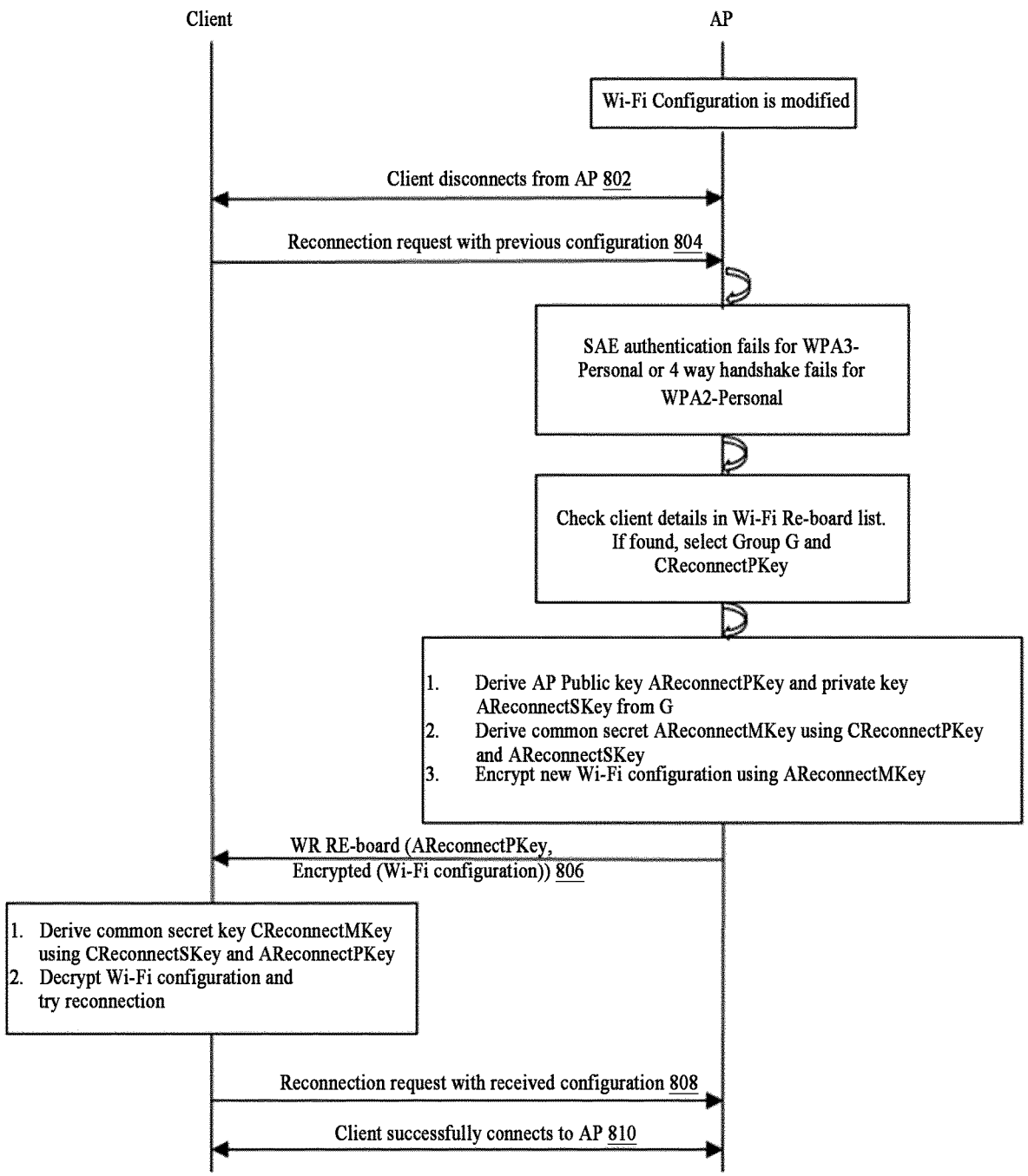
FIG. 8 illustrates a sequential flow diagram for sharing modified credentials for re-connecting, according to the embodiments as disclosed herein.

FIG. 8 illustrates a sequential flow diagram for sharing modified credentials for re-connecting, according to the embodiments as disclosed herein. As shown in FIG. 8, the client 300 disconnects from the Wi-Fi network 802 when the Wi-Fi AP's configuration changes. Then, the client 300 tries to reconnect 804 to the AP 200 using its previously saved Wi-Fi AP configuration. Now, the AP 200 determines that the client 300 is not able to reconnect back (either by Simultaneous Authentication of Equals (SAE) authentication failure in Wi-Fi Protected Access (WPA) 3 or 4-way handshake failure in WPA2). Then, AP 200 goes through the Re-Board list in the memory 230 and checks the client details.

Figure 9C:
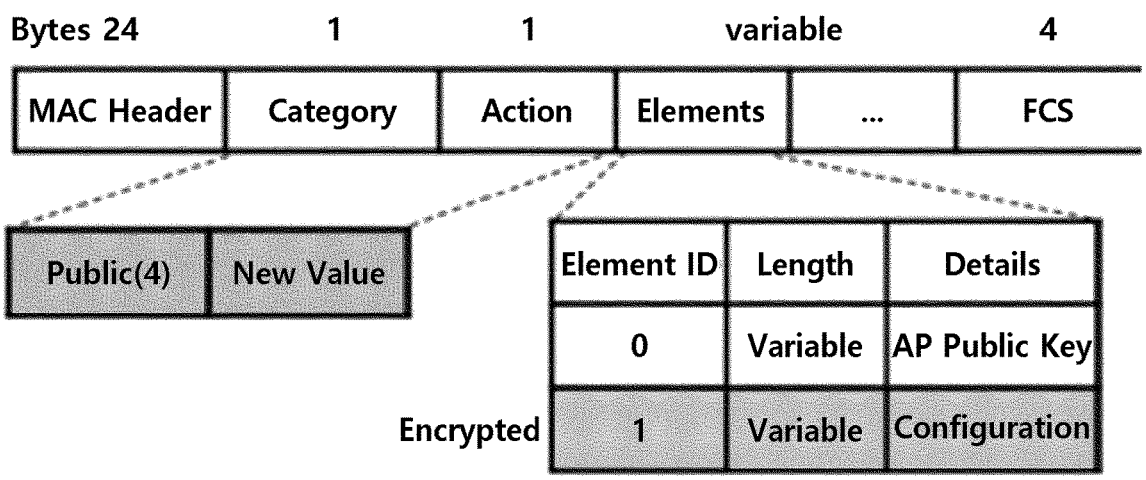
FIG. 9C illustrates a scenario of WR Re-board public action frame format, according to the embodiments as disclosed herein.

Once the AP 200 finds the client 300 in the Re-board list, then the AP 200 derives its public key (called AReconnectPKey) and private key (called AReconnectSKey) from the crypto group G that the client 300 selected earlier. At this point, the AP 200 generates a common secret key (AReconnectMKey) using AP's private key (AReconnectSKey) and the client's public key (CReconnectPKey). Then, the AP 200 sends the WR Re-board frame 806 (as shown in FIG. 9C), containing the AP's public key (AReconnectPKey) and the new configuration that is encrypted using the derived AReconnectMKey. Meanwhile, on receiving the WR Re-board frame, the client 300 also prepares common secret key (CReconnectMKey) using its private key (CReconnectSKey) and AP's public key (AReconnectPKey). Using the common secret key (CReconnectMKey), the client 300 will decrypt the new configuration, send a reconnection request 808, and reconnect back 810 to the AP 200 successfully. Now, the new configuration is only shared with the previously connected clients securely. So, all the client 300 (e.g., IoT, headless devices, Smartphones, etc.) will reconnect automatically to the AP 200 without any user intervention.

Figure 10:
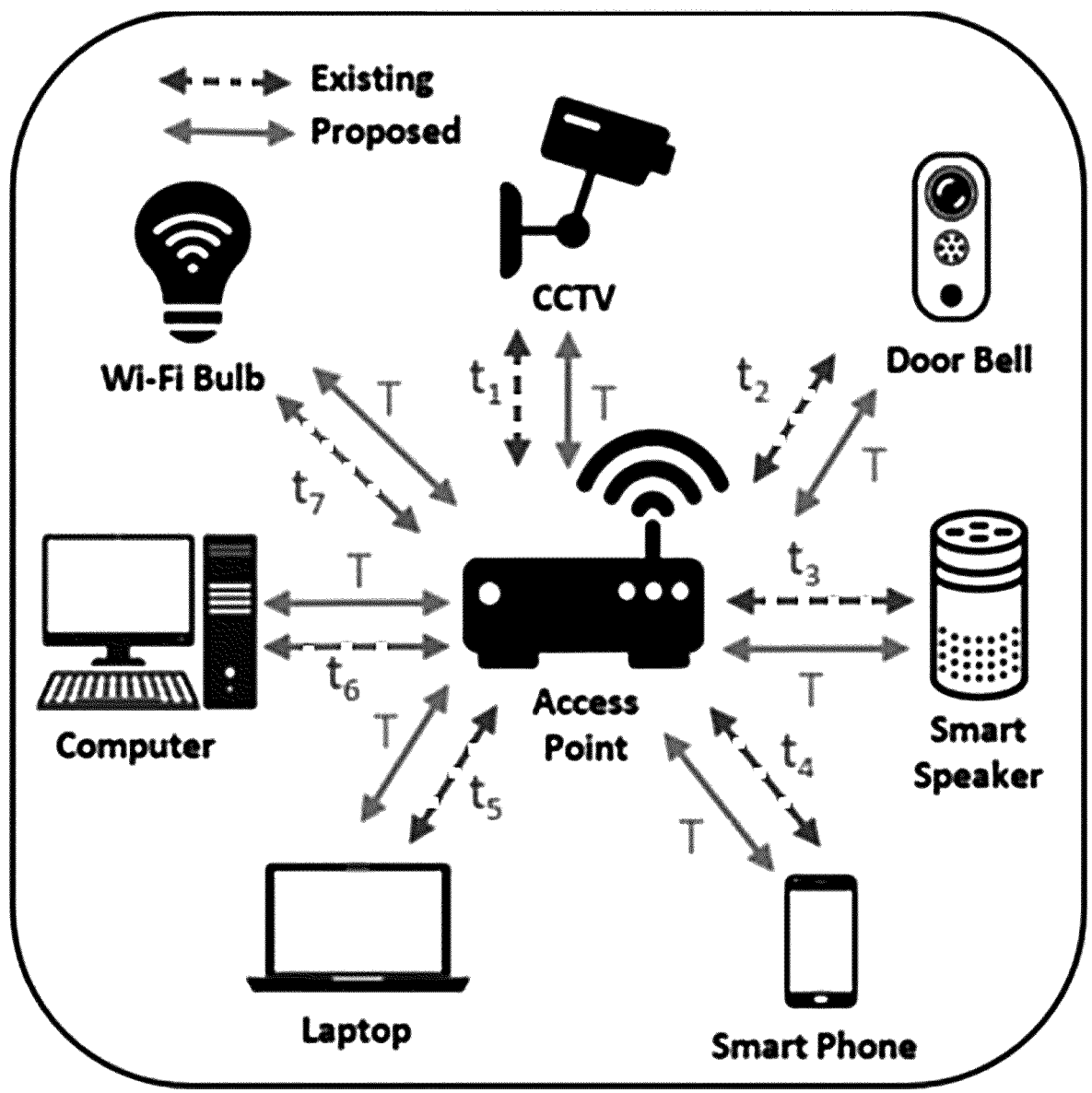
FIG. 10 illustrates a scenario of reconnection time for different client devices using an existing and proposed method, according to the embodiments as disclosed herein.

FIG. 10 illustrates a scenario of reconnection time for different client devices using an existing and proposed method, according to the embodiments as disclosed herein. As shown in FIG. 10, let us consider there are 'N' number of Wi-Fi clients (e.g., headless and rich UI) connected to the Wi-Fi AP, and the user changes the AP configuration. The total reconnection time of 'N' clients for the existing method is given by eq. (1).

$$\text{TotalTime}_{reconn}(\text{existing}) = \Sigma_{j=1}^{N}(t_j) \quad (1)$$

Wherein, '$t_j$' is the reconnection time of the $j^{th}$ client.

We note that in the existing method, '$t_j$' represents a variable reconnection time, as shown in FIG. 10. The parameter '$t_j$' is variable because it depends on the type of the client (headless or rich UI) and its manual procedure to enter the Wi-Fi AP configurations (including the length of the new password).

However, in the proposed method, the total reconnection time is calculated as shown in eq. (2)

$$\text{TotalTime}_{reconn}(\text{proposed}) = \text{Time}_{initial} + \text{Time}_{reconn} \quad (2)$$

Here, '$\text{Time}_{initial}$' is the total time for the WR Public Key Request/Response frame exchanges between the AP and Wi-Fi clients.

This initial time is further calculated as shown in eq. (3)

$$\text{Time}_{initial} = \Sigma_{j=1}^{N}(T_j) \quad (3)$$

Where '$T_j$' is the time taken by each Wi-Fi client for the WR Public Key Request/Response frame exchanges with AP. We note that '$T_j$' is a constant as shown in FIG. 10 for all the clients (same frames are exchanged), and let us consider the initial time as '$\alpha$' for each client. Now, the equation (3) becomes:

$$\text{Time}_{initial} = \Sigma_{j=1}^{N}(\alpha) = N\alpha \quad (4)$$

Next, '$\text{Time}_{reconn}$' is the total reconnection time for the Wi-Fi clients 300 when the AP configuration is changed using the WiFi Reboard method. However, in the proposed method, the reconnection time of each client is constant for all the clients irrespective of the type of the client and length of the new password (because it is automatic, without any user intervention), and let us consider the reconnection time as '$\beta$' for each client. This reconnection time is calculated as shown below eq. (5):

$$\text{Time}_{reconn} = \Sigma_{j=1}^{N}(\beta) = N\delta \quad (5)$$

Now, substituting eq. (4) and (5) in eq. (2):

$$\text{TotalTime}_{reconn}(\text{proposed}) = N(\alpha + \beta) \quad (6)$$

Where, '$\alpha$' and '$\beta$' are constant value in time and they are comparatively smaller as in simple Wi-Fi frame exchanges. Hence, the equation (6) becomes:

$$\text{TotalTime}_{reconn}(\text{proposed}) = N(\alpha + \beta) = N*C \propto N \quad (7)$$

Hence, the total time saved with proposed method compared to existing method is shown in eq. (8) and (9).

$$\text{Time}_{saved} = \frac{\text{Existing method reconnection time}}{\text{Proposed method reconnection time}} \quad (8)$$

$$\text{Time}_{saved} = \frac{\Sigma_{j=1}^{N}(t_j)}{NC} \propto \frac{\Sigma_{j=1}^{N}(t_j)}{N} \text{ for large } N \quad (9)$$

Figure 11:
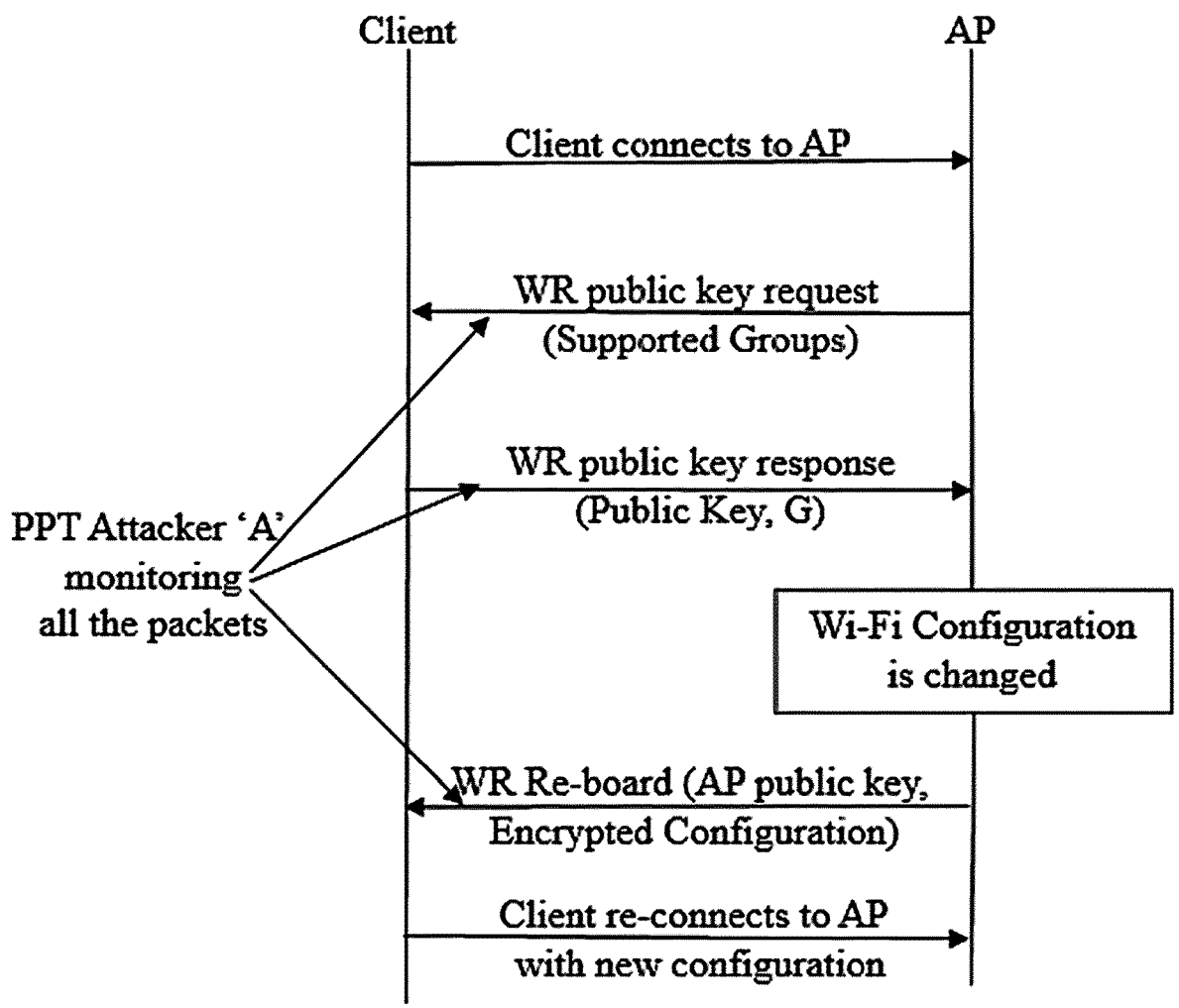
FIG. 11 illustrates a scenario of attack flow during re-board frame exchange, according to the embodiments as disclosed herein.

FIG. 11 illustrating a scenario of attack flow during re-board frame exchange, according to the embodiments as disclosed herein. As shown in FIG. 11, let us assume there is a Probabilistic Polynomial Time (PPT) attacker 'A' monitoring all the Wi-Fi Re-board (WR) frames between the AP and the Wi-Fi client.

Let $\pi$=(Gen, Enc, Dec) is an Elliptic Curve El-Gamal (ECEG) scheme where 'Gen' is an ECEG public ('Pk') and private ('Sk') key generation function. Further, the 'Gen' function implementation and the derived public key are known to the entire world. Then, 'Enc' is a publicly known randomized encryption function that the AP uses. It is used to generate the cipher text of AP's modified configuration by using the client's 'Pk' and Wi-Fi AP's 'Sk'. Next, 'Dec' is a publicly known deterministic decryption function that the client uses. This decrypts the Wi-Fi AP's modified configuration from the cipher text by using Wi-Fi AP's 'Pk' and client's 'Sk'.

Any rogue station or a PPT attacker 'A' may also view the encrypted message and 'Pk' in the WR Re-board Frame. However, they cannot decrypt the AP's configuration without the corresponding 'Sk'. Similarly, any rogue AP or Evil Twin AP cannot influence the client connection by sharing its configuration to the client. As the client did not share its public key to the rogue AP earlier (or not connected), it cannot decrypt the corresponding rogue AP's modified configuration from the encrypted message. Hence, is CPA (Chosen Plain Text Attack) secure for every PPT attacker 'A' with the probability 'prob' as shown below eq. (10)

$$\text{Prob}[\text{WiFiReboardA}, \pi cpa(p)=1] \leq 1/2 + \text{negl}(p) \quad (10)$$

Where 'p' is a length of the prime number that is used in ECEG scheme.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A method for securely handling re-connection by a wireless device, the method comprising:
   establishing, by the wireless device, a connection with a plurality of client devices using a first security configuration;
   sending, by the wireless device, a public key request message to the plurality of client devices upon the successful establishment of connection between the plurality of client devices and the wireless device, wherein the public key request message includes information about crypto groups supported by the wireless device;
   receiving, by the wireless device, one or more public key response messages from one or more client devices in response to the public key request message, wherein each of the one or more public key response messages includes a public key associated with a particular client device, and a selected crypto group from the crypto groups;

storing, by the wireless device, a unique identifier associated with each of the one or more client devices along with the public key response message in a re-board list;

detecting, by the wireless device, whether at least one criterion is met to re-establish the connection with the plurality of client devices;

generating, by the wireless device, a second security configuration to re-establish the connection with the plurality of client devices in response to detecting that the at least one criterion is met;

encrypting, by the wireless device, the second security configuration; and sending, by the wireless device, the encrypted second security configuration to the plurality of client devices to re-establish the connection with the wireless device.

2. The method as claimed in claim 1, further comprising:
receiving, by the wireless device, a request to re-establish the connection from one or more client devices of the plurality of client devices using the second security configuration; and reestablishing, by the wireless device, the connection with the one or more client devices of the plurality of client devices based on the second security configuration.

3. The method as claimed in claim 1, wherein the at least one criterion is
detecting an expiry of a time period associated with the wireless device to reestablish the connection with the plurality of client devices,
detecting an expiry of a time period associated with at least one client device of the plurality of client devices to reestablish the connection with the wireless device,
detecting a vulnerability in the wireless device, or
detecting a vulnerability in the associated with at least one client device of the plurality of client devices.

4. The method as claimed in claim 1, wherein the first security configuration comprises a first service set identifier (SSID), a first password, or combination of the first SSID and the first password, and wherein the second security configuration comprises a second SSID, a second password, or combination of the second SSID and the second password, the second SSID and the second password being respectively different than the first SSID and the first password.

5. The method as claimed in claim 1, further comprising:
detecting, by the wireless device, an attempt from one or more client devices of the plurality of client devices to connect the wireless device using the first security configuration after the wireless device is configured with the second security configuration;

verifying, by the wireless device, an identifier associated with each of the one or more client devices of the plurality of client devices against the stored unique identifier in the re-board list; and generating, by the wireless device, a common secret key for each of the one or more client devices stored in the re-board list upon successful verification, wherein the common secret key is generated using the public key associated with the particular client device and a private key associated with the wireless device.

6. The method as claimed in claim 5, further comprising:
sending a public key associated with the wireless device along with the encrypted second security configuration, wherein the encrypted second security configuration is encrypted using the common secret key.

7. A method for re-connecting a client device to a wireless device, the method comprising:
establishing, by the client device, a connection with the wireless device;

receiving, by the client device, a public key request message from the wireless device upon the successful establishment of connection between the wireless device and the client device, wherein the public key request message includes information about crypto groups supported by the client device;

sending, by the client device, a public key response message to the wireless device in response to the public key request message, wherein the public key response message includes a public key associated with the wireless device, and a selected crypto group from the crypto groups;

detecting, by the client device, a change in configuration of the wireless device from a first security configuration to a second security configuration in response to disconnection of the established connection;

receiving, by the client device, an encrypted second security configuration from the wireless device;

decrypting, by the client device, the encrypted second security configuration; and re-connecting, by the client device, to the wireless device using the decrypted second security configuration.

8. The method as claimed in claim 7, further comprising:
receiving, by the client device, the encrypted second security configuration along with a public key of the wireless device.

9. The method as claimed in claim 7, wherein decrypting the encrypted second security configuration comprises:
generating, by the client device, a common secret key using the public key of the wireless device and a private key associated with the client device; and decrypting the encrypted second security configuration using the generated common secret key.

10. A wireless device for securely handling re-connection, the wireless device comprising:
a memory; and
a processor, coupled to the memory, configured to:
establish a connection with a plurality of client devices, wherein the wireless device establishes the connection with the plurality of client devices using a first security configuration;

send a public key request message to the plurality of client devices upon the successful establishment of connection between the plurality of client devices and the wireless device, wherein the public key request message includes information about crypto groups supported by the wireless device;

receive one or more public key response messages from one or more client devices in response to the public key request message, wherein each of the one or more public key response messages includes a public key associated with a particular client device, and a selected crypto group from the crypto groups; and store a unique identifier associated with each of the one or more client devices along with the public key response message in a re-board list, detect whether at least one criterion is met to reestablish the connection with the plurality of client devices;

generate a second security configuration to reestablish the connection with the plurality of client devices in response to detecting that the at least one criterion is met;

encrypt the second security configuration; and
send the encrypted second security configuration to the plurality of client devices to reestablish the connection with the wireless device.

11. The wireless device as claimed in claim 10, wherein the processor is further configured to:
receive a request to re-establish the connection from one or more client devices of the plurality of client devices using the second security configuration; and
reestablish the connection with the one or more client devices of the plurality of client devices based on the second security configuration.

12. The wireless device as claimed in claim 10, wherein to detect the at least one criterion, the processor is configured to:
detect an expiry of a time period associated with the wireless device to reestablish the connection with the plurality of client devices,
detect an expiry of a time period associated with at least one client device of the plurality of client devices to reestablish the connection with the wireless device,
detect a vulnerability in the wireless device, or
detect a vulnerability in the associated with at least one client device of the plurality of client devices.

13. The wireless device as claimed in claim 10, wherein the processor is further configured to:
detect an attempt from one or more client devices of the plurality of client devices to connect the wireless device using the first security configuration after the wireless device is configured with the second security configuration;
verify an identifier associated with each of the one or more client devices of the plurality of client devices against the stored unique identifier in the re-board list; and
generate a common secret key for each of the one or more client devices stored in the re-board list upon successful verification, wherein the common secret key is generated using a public key associated with the particular client device and a private key associated with the wireless device.

14. A client device for securely reconnecting with a wireless device, the client device comprising:
a memory; and
a processor, coupled to the memory, configured to:
establish a connection with the wireless device;
receive a public key request message from the wireless device upon the successful establishment of connection between the wireless device and the client device, wherein the public key request message includes information about crypto groups supported by the client device;
send a public key response message to the wireless device in response to the public key request message, wherein the public key response message includes a public key associated with the wireless device, and a selected crypto group from the crypto groups;
detect a change in configuration of the wireless device from a first security configuration to a second security configuration in response to disconnection of the established connection;
receive an encrypted second security configuration from the wireless device;
decrypt the encrypted second security configuration; and
re-connect to the wireless device using the decrypted second security configuration.

15. The client device as claimed in claim 14, wherein the processor is further configured to receive the encrypted second security configuration along with a public key of the wireless device.

16. The client device as claimed in claim 14, wherein to decrypt the encrypted second security configuration, the processor is configured to:
generate a common secret key using a public key associated with the wireless device and a private key associated with the client device; and
decrypt the encrypted second security configuration using the generated common secret key.

* * * * *